(12) United States Patent
Choiniere et al.

(10) Patent No.: US 6,634,529 B2
(45) Date of Patent: Oct. 21, 2003

(54) ROOFTOP CARRIER FOR VEHICLE

(76) Inventors: Gilles Choiniere, 204 Gemme, Granby, Quebec (CA), J2J 2B5; Bernard Laplante, 61 Elgin, Granby, Quebec (CA), J2G 4V2

( * ) Notice: Subject to any disclaimer, the term of this patent is extended or adjusted under 35 U.S.C. 154(b) by 212 days.

(21) Appl. No.: 09/867,134

(22) Filed: May 29, 2001

(65) Prior Publication Data

US 2002/0179661 A1 Dec. 5, 2002

(51) Int. Cl.[7] ................................................. B60R 9/00
(52) U.S. Cl. ....................... 224/310; 224/324; 224/924; 414/462
(58) Field of Search .................................. 224/310, 324, 224/924; 414/462

(56) References Cited

U.S. PATENT DOCUMENTS

| | | | | |
|---|---|---|---|---|
| 3,215,294 A | * | 11/1965 | Salamin | 414/462 |
| 4,272,218 A | * | 6/1981 | Carter | 414/462 |
| 5,360,151 A | * | 11/1994 | Fine | 224/310 |
| 5,421,495 A | * | 6/1995 | Bubik et al. | 224/310 |
| 5,709,521 A | * | 1/1998 | Glass et al. | 414/462 |
| 5,827,036 A | * | 10/1998 | Steffes et al. | 414/462 |
| 6,149,039 A | * | 11/2000 | Englander | 224/310 |

* cited by examiner

*Primary Examiner*—Stephen K. Cronin
(74) *Attorney, Agent, or Firm*—Eric Fincham

(57) ABSTRACT

A rooftop rack for carrying bicycles, the rack comprising a base which is mounted on the vehicle roof, a pivotable arm connected to the base, the arm being moveable between a first upright storage position and a second outboard position, a first platform for carrying at least one bicycle, a winch mounted on the base, a cable extending from the winch to a distal end of the pivotable arm and to the first platform, the arrangement being such that when the pivotable arm is in the storage position, the platform is retained by the distal end of the pivotable arm while when the pivotable arm is in the second outboard position, the first platform can be released from the pivotable arm. The rack permits loading of the bicycles at ground level from where they can be moved by means of the winch to the stored position on the roof of the vehicle.

11 Claims, 11 Drawing Sheets

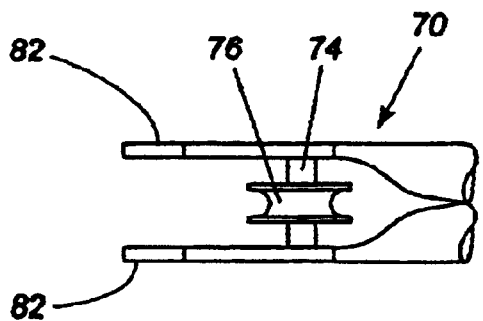
Fig. 8
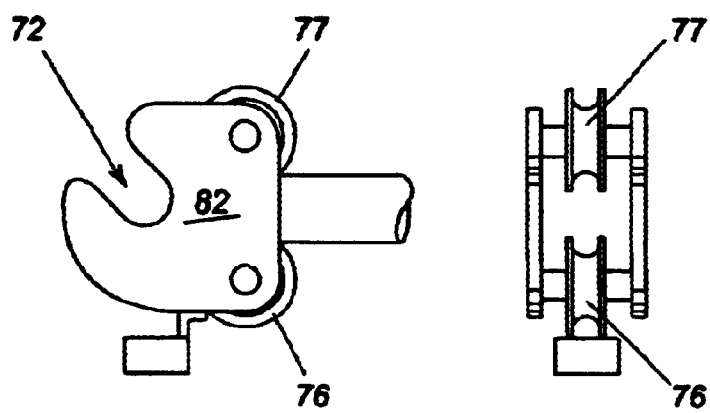
Fig. 9a  Fig. 9b
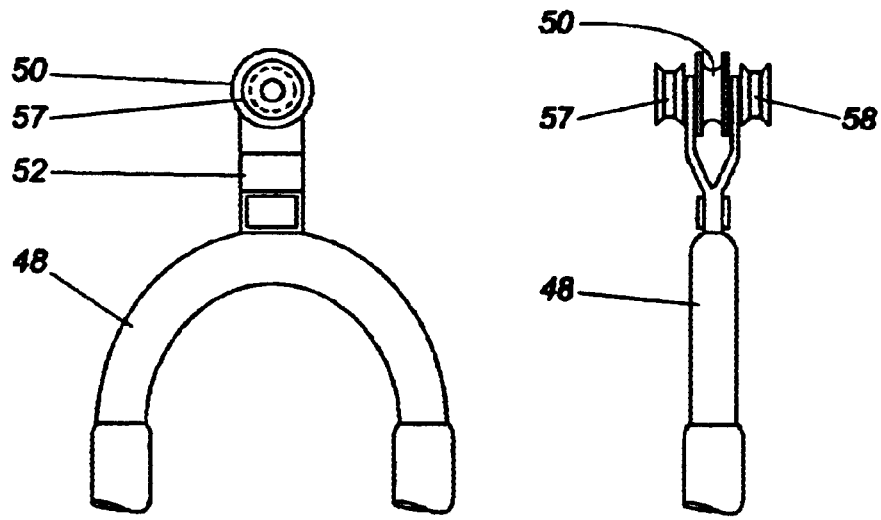
Fig. 10a  Fig. 10b

ROOFTOP CARRIER FOR VEHICLE

FIELD OF THE INVENTION

The present invention relates to a rooftop carrier for use with an automotive vehicle.

BACKGROUND OF THE INVENTION

In the past number of years, there has been a resurgence of interest in the sport of bicycling. Bicycling, as one traditionally understands the pastime, now enjoys a new surge of interest; the interest in bicycling has branched off into new directions off road or mountain biking. The city streets are crowded with cars and trucks and it is therefore commonplace to see bicycle enthusiasts transporting their bicycles to parks, bicycle paths, and the like.

Various methods of bicycle transportation are used. Thus, there are bicycle racks which attach to vehicle tow bars and the like. A further method of transporting bicycles is a bicycle rack supported on a vehicle rooftop by a pair of transverse support bars. This method of bicycle transportation requires rooftop access and this is often difficult. Thus, one may need the use of a ladder when one is dealing with minivans or the like. Otherwise, the user must climb from the top of the vehicle to access the rooftop rack to load or unload the bicycles. This is particularly true when the transported bicycles are positioned toward the center of the vehicle such as when multiple bicycles are carried and when a van or sport utility vehicle is the transporting vehicle.

Another potential difficulty with presently known rooftop bicycle racks arises when multiple bicycles are transported. Access to a bicycle near the center of the vehicle is desired, the bicycles toward the sides of the vehicle must first be removed.

These inconveniences of rooftop bicycle transportation systems have been known and various proposals have been advanced to overcome the difficulties. Thus, there are known arrangements wherein the rack is delivered to the user rather than the user going on top of the vehicle to the rack. Such arrangements are known, for example, from U.S. Pat. No. 5,690,259 which teaches a roof rack system of the above type.

Also known, from U.S. Pat. No. 5,360,151 is a bicycle carrier wherein there is a base frame for attachment to the bars of a carrier rack. Hingedly connected to a frame is a loading frame for positioning over a bicycle to be loaded and equipped to receive and hold the bicycle while being manually lifted from the side of the vehicle to its rooftop for securement thereon for and during travel. The bicycle swings with the loading frame from an upright position beside the vehicle to an upside down position on top of the vehicle.

It is also known from U.S. Pat. No. 5,284,282 to provide an arrangement wherein the rack can be manually pulled down and manually raised to a position on top of the vehicle.

SUMMARY OF THE INVENTION

It is an object of the present invention to provide a bicycle rooftop rack system which overcomes some of the disadvantages of the prior art.

It is a further object to provide a bicycle rooftop rack system wherein a pair of platforms are used to raise and lower the bicycles to their position on top of the roof of the vehicle.

According to one embodiment of the present invention, there is provided a rooftop rack for carrying an object on a vehicle, the rooftop rack comprising a base mountable on a vehicle roof, a pivotable arm having a first end pivotably connected to the base, the pivotable arm being moveable between first and second positions, a first platform for carrying the object, a spool mounted on the base, a cable extending from the spool to a distal end of the pivotable arm and then to the first platform, means for turning the spool and the first platform being retained by a second end of the pivotable arm such that when the pivotable arm is in a first position, the first platform is held by the cable against the second end of the arm while when the pivotable arm is in the second position, the first platform can be released from the pivotable arm.

In the present disclosure, reference will be made to a rooftop rack for carrying bicycles. It will be understood that within the scope of this term, other two wheeled vehicles may likewise be carried including, for example, scooters, motorcycles, etc. Also, although the rack is primarily designed for bicycles, the platform can also be used for carrying other objects such as kayaks, canoes, surfboards, etc.

As aforementioned, there is provided a platform which is connected to a pivotable arm or boom, and which pivotable arm or boom is pivotably connected to a base mounted on a vehicle.

The pivotable arm is configured such that when, in a first upright position, it maintains the platform on the vehicle. In a second position, it extends outwardly over the side of the vehicle and permits a platform to be disconnected therefrom and lowered to the ground.

The platform has means for receiving an object thereon and preferably, includes means for receiving first and second bicycles and also has means for securing the bicycles to the platform. In one preferred embodiment, retaining straps are employed for attachment to the cross bar of a bicycle.

Means for raising and lowering the pivotable arm are provided. In a preferred embodiment, an electric winch type of arrangement is provided wherein a cable is entrained about a spool and then through various pulleys to be secured to the top of the platform. Preferably, the electric motor is capable of being used with a remote control. Alternatively, one could use a manual winch.

In a preferred embodiment, there is provided a second platform which is designed to be used on an opposite side of the vehicle compared to the first platform. A similar arrangement is employed for both sides. This permits the use of the same cable for both the first and second platforms.

The roof rack, in the embodiment wherein there is provided two platforms, is designed to use a single cable to raise and lower both of the platforms. The distal end of the pivotable arm is releasably secured to the platform. When in the stored position, the platforms are held in that position by means of a locking mechanism as will be described in greater detail hereinbelow.

The pivotable arms may be secured together by means of a cylinder and/or mechanical means.

The cable may be any suitable and preferably will comprise a plastic cover wire cable to minimize corrosion. As aforementioned, the cable will extend from the spool toward a distal tip of a first one of the pivotal arms and then to a distal end of the platform.

The pivotal arm and respective platform will have a point of contact when the cable is in a taut position and will be anchored mechanically when in a stored position.

The uncoupling of the platform and the pivotal arm is possible because the center of gravity changes in a manner which permits the platform, which is being uncoupled, to continue its downward movement to reach the ground as will be discussed in greater detail hereinbelow.

Preferably, there is provided an air cylinder interconnecting first and second pivotal arms. The air cylinder is functional to initiate the start of the lateral movement of the pivotal arms as will become apparent hereinbelow.

The cable is journaled in a pulley at a distal end of the pivotal arm and the platform pulley. This has the effect, at the time of uncoupling, that the cable forms a loop. The net effect is to provide a multiplication of the lever in a ratio of 2:1. Thus, the cable passing from the distal end of the pivotal arms to the pulley at the mast of the platform then returns to a second pulley at the distal end of the pivotal arm before heading to the second side of the rack.

When the platforms are in their position on the roof of the vehicle, the platform is secured to the base which is attached to the roof of the vehicle. One side will act as a support for the other side during the process of raising and lowering the other platform.

BRIEF DESCRIPTION OF THE DRAWINGS

Having thus generally described the invention, reference will be made to the accompanying drawings illustrating an embodiment thereof, in which:

FIG. 8 is a top plan view of a portion of a first boom end member;

FIG. 9a is a side view thereof;

FIG. 9b is a rear elevational view thereof;

FIG. 10a is a rear view of the top portion of one of the platforms;

FIG. 10b is a side view thereof;

DESCRIPTION OF THE PREFERRED EMBODIMENTS

Figure 1:
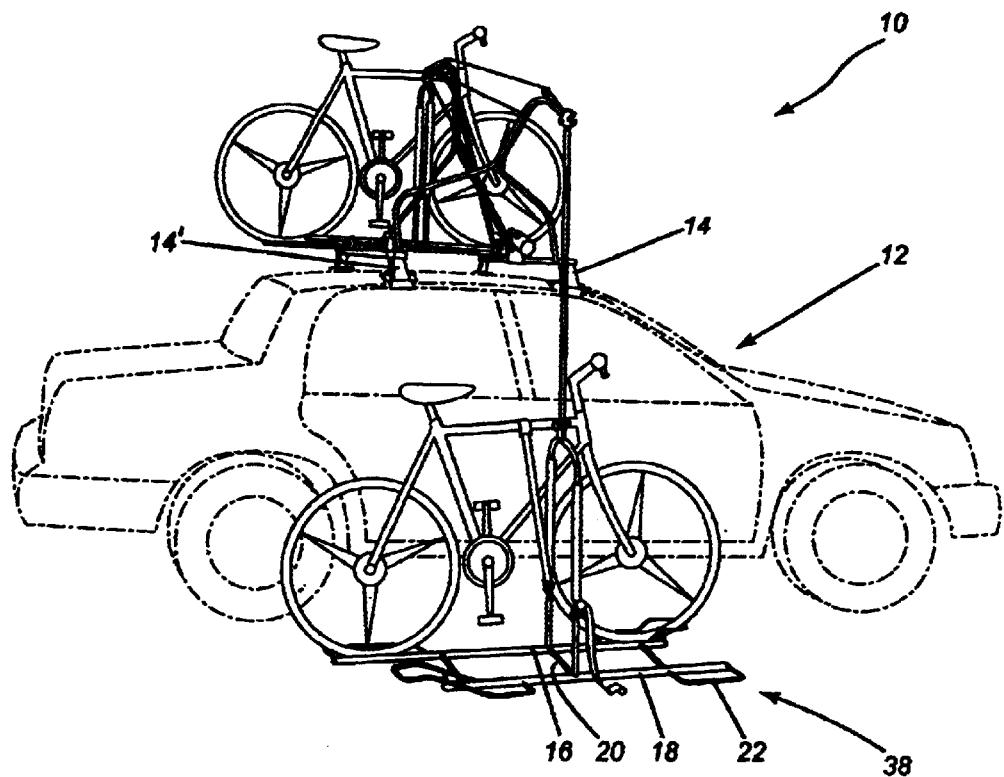
FIG. 1 is a perspective view of a bicycle rack according to one embodiment of the invention, the bicycle rack being shown with one side in the mounted position on a vehicle shown in phantom outline and the other side being lowered.

Referring to the drawings in greater detail and by reference characters thereto, there is illustrated in FIG. 1 a rooftop bicycle rack according to one embodiment of the present invention in which the rooftop rack is generally designated by reference numeral 10. Rooftop rack 10 is shown positioned on an automobile (shown in phantom outline) and which is generally designated by reference numeral 12.

Rooftop rack 10 is designed to be mounted on car rack support bars which are generally designated by reference numerals 14, 14' and which may be any conventional type of support bar, either being integrated with the vehicle or supplied as separate members.

Rooftop rack 10 has a first platform generally designated by reference numeral 38 and which includes a pair of longitudinally extending frame members 16 and 18 which in turn are connected by a transversely extending cross member 20. As may be seen in FIG. 2, longitudinally extending frame members 16 and 18 are parallel, but lie in a slightly different horizontal plane.

Mounted at the front end of longitudinally extending frame member 16 is a wheel cradle generally designated by reference numeral 22 and which is comprised of a U-shaped member 24 defining a recess designed to receive a wheel of a bicycle.

At the rearward end of longitudinally extending frame member 16, there is provided a second wheel cradle generally designated by reference numeral 26 and which is comprised of a U-shaped member 28 defining a recess to receive a bicycle wheel.

Platform 38 also includes a first vertical post 40 which is connected to first longitudinally extending frame member 16 and which first vertical post 40 includes protective padding 42 thereon. Extending upwardly from second longitudinally extending frame member 18 is a second vertical post 44 also having protective padding 46 thereon. Vertical posts 40 and 44 are joined at their upper end by an inverted U-shaped upper portion 48 as may be best seen in FIG. 10a and 10b.

Mounted on inverted U-shaped upper portion 48 is a pulley support 52. As best seen in FIGS. 10a and 10b, pulley support 52 has mounted thereon an inner pulley 50 and a pair of outer guides 57 and 58.

Mounted on frame member 16 are wheel cradles 54 and 56 which are similar to wheel cradles 22 and 26.

A boom or pivotal arm 60 is pivotably connected to support bar 14 as indicated by pivot point 68. Boom 60 has a first arm segment 62 which is connected at pivot point 68, a second arm segment 64 and a third distal arm segment 66. Mounted at the end of distal arm segment 66 is a boom end member generally designated by reference numeral 70 and which is best illustrated in FIGS. 8a, 8b and 8c.

Boom end member 70 includes a U-shaped notch generally designated by reference numeral 72 for reasons which will be described hereinbelow. Boom end member 70 has a pair of side walls 82 between which extends an axle 74 to receive a pulley 76.

Figure 2:
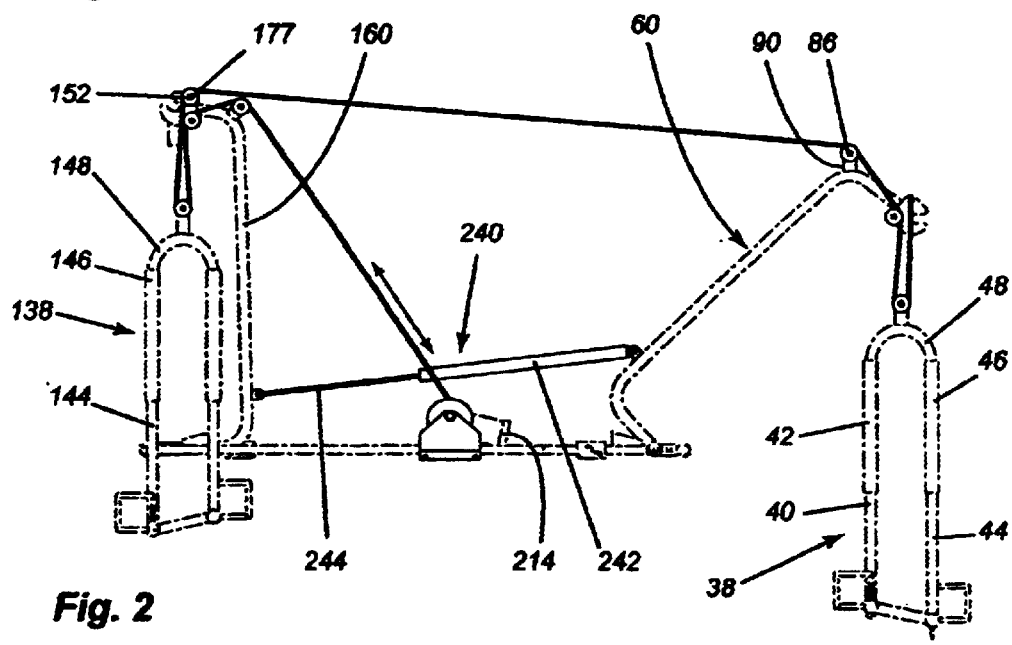
FIG. 2 is an end elevational view illustrating a portion of the bicycle rack.
Figure 3:
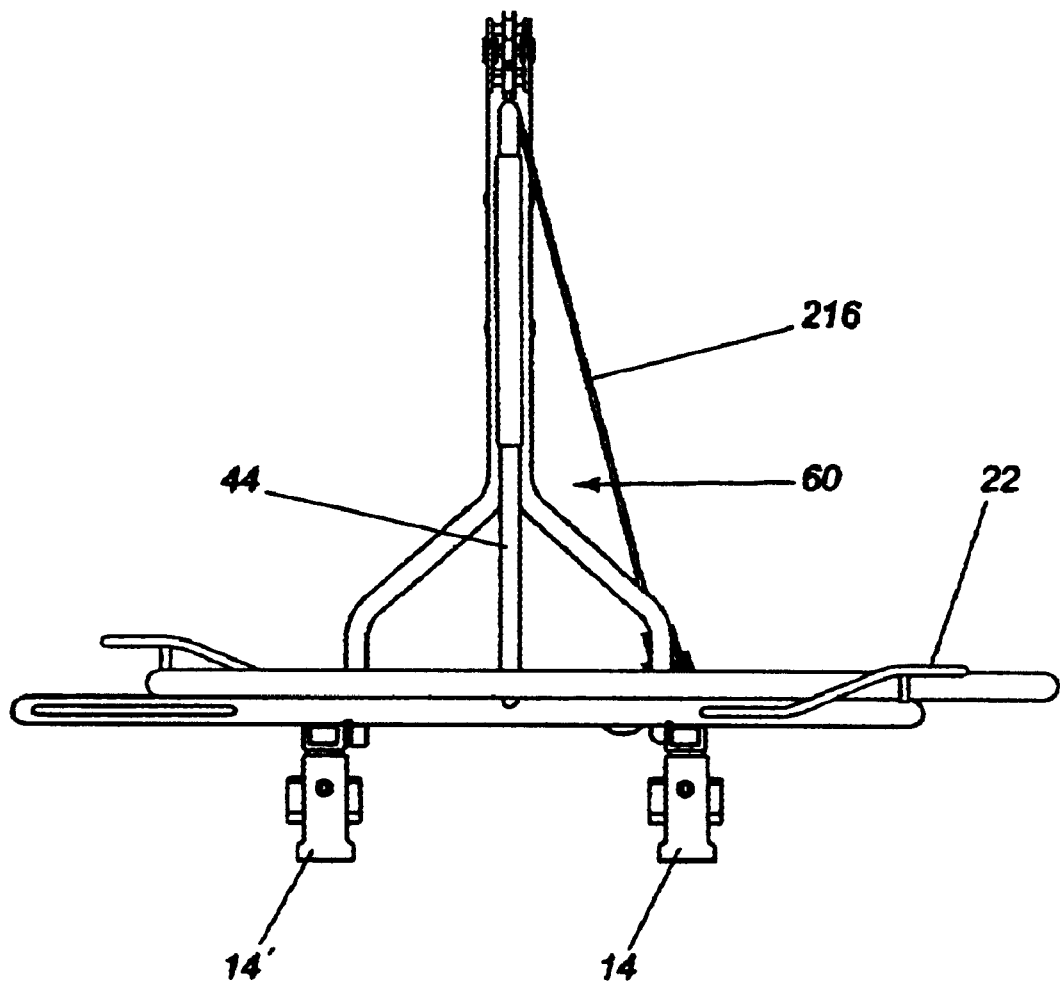
FIG. 3 is a side elevational view of a portion of one of the platforms of the bicycle rack.
Figure 4:
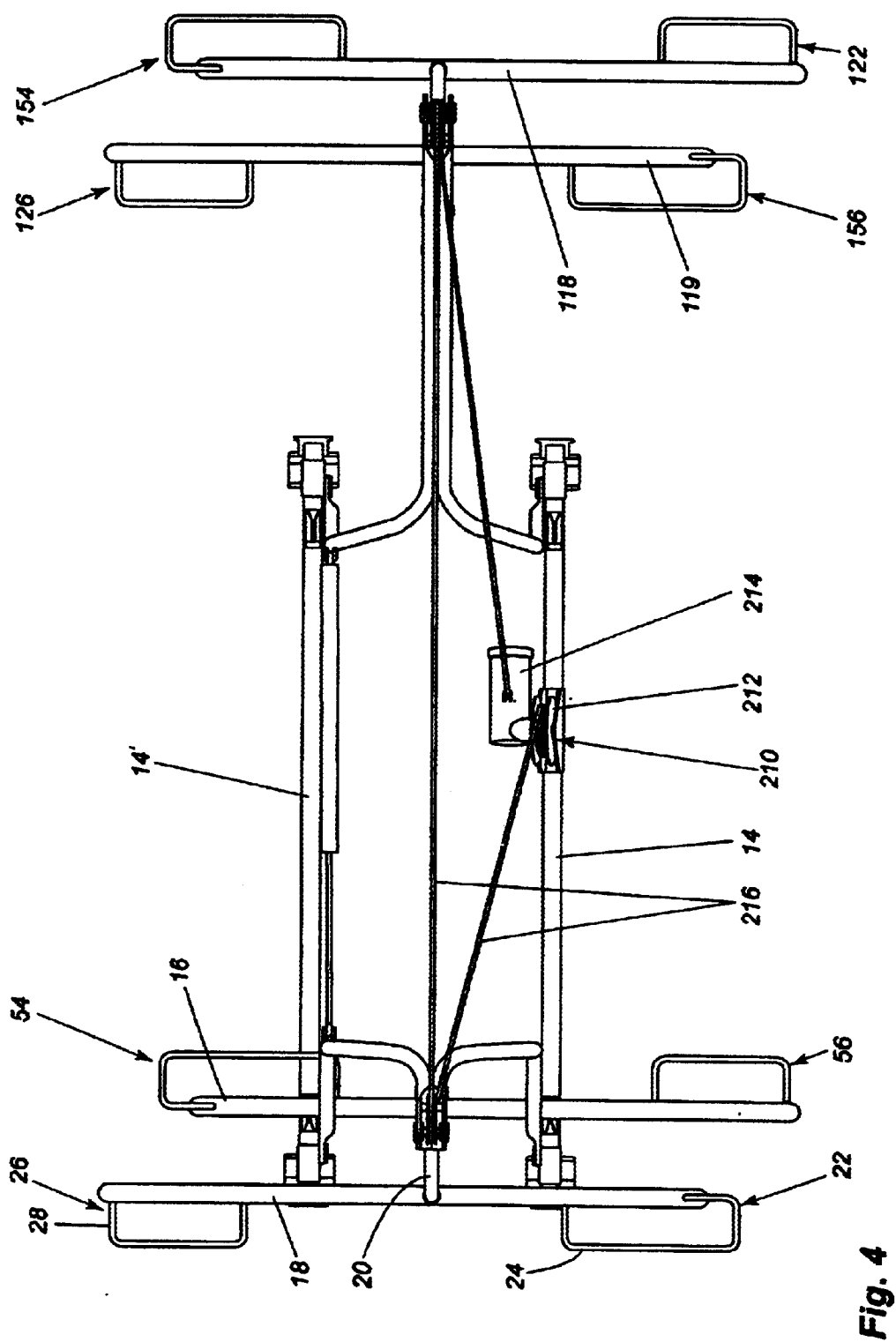
FIG. 4 is a top plan view of the bicycle rack.

As best seen in FIG. 2, there is provided a pulley support member 90 proximate the point of juncture of arm segments 64 and 66 for the support of a further pulley 86.

For the purpose of securing the bicycles on the rack, there are provided tie down straps 78 and 80 which are secured to posts 44 and 40 respectively. Tie down straps 78 and 80 may be any conventional type and designed to be secured to a portion of the bicycle.

A locking ring 92 comprises a circular member having an aperture therein and which is designed to fit over the end of a support bar 14 as will be described hereinbelow.

Mounted on the other side of the vehicle is a second platform which is generally designated by reference numeral 138. In this regard, platform 138 is similar to platform 38 and thus, similar reference numerals in the 100's are employed for similar components.

Mounted on support bar 14 is a bracket 210 to support a winch 212. In turn, an electric motor 214 is provided to turn winch 212 which has a cable 216 entrained thereabout.

Figure 14:
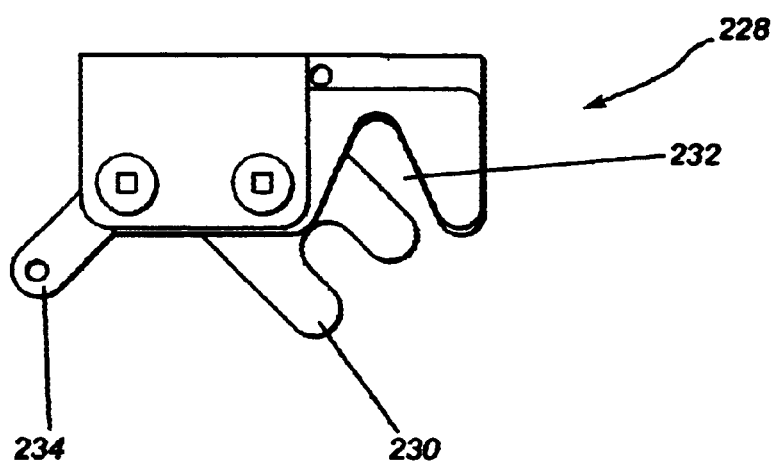
FIG. 14 is a detailed view of the mechanism for receiving the moveable platform.
Figure 15:
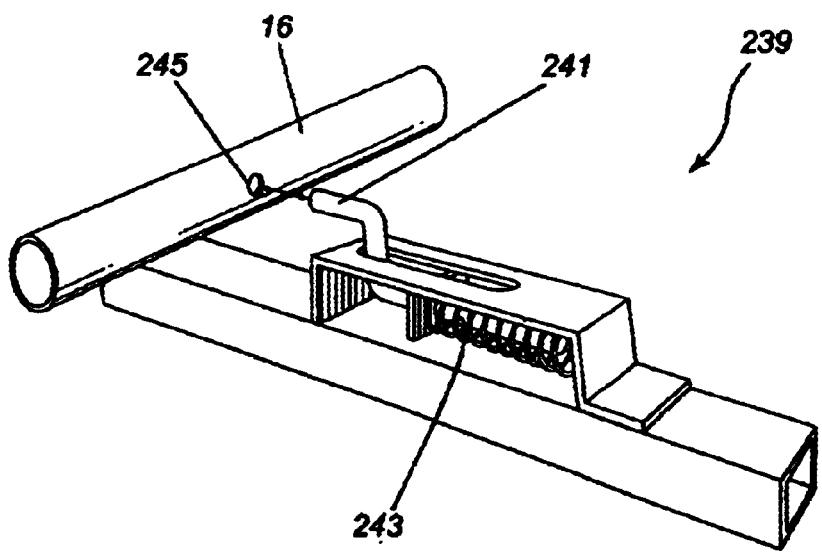
FIG. 15 is a detailed view of the mechanism for locking the platform in a stored position.

As shown in FIG. 14, there is provided a locking mechanism generally designated by reference numeral 228 and which is designed to retain the platform when in the storage position. Locking mechanism 228 is of the known spring actuated type and includes a U shaped member 230 to receive therebetween a portion of the platform. U shaped portion 230 will then be biased inwardly to notch 232. A lever 234 is provided for moving U shaped portion 230 into and out of the locked position.

As shown in FIG. 9, there is provided a ejector mechanism generally designated by reference numeral 240. Ejector mechanism 240 includes a pin 242 designed to fit within aperture 244 of member 16. When the platform is in the locked position, a spring 244 is under compression. When the locking mechanism 228 is released, spring 244 will exert an outward pressure on member 16 to start the unloading procedure.

Figure 13:
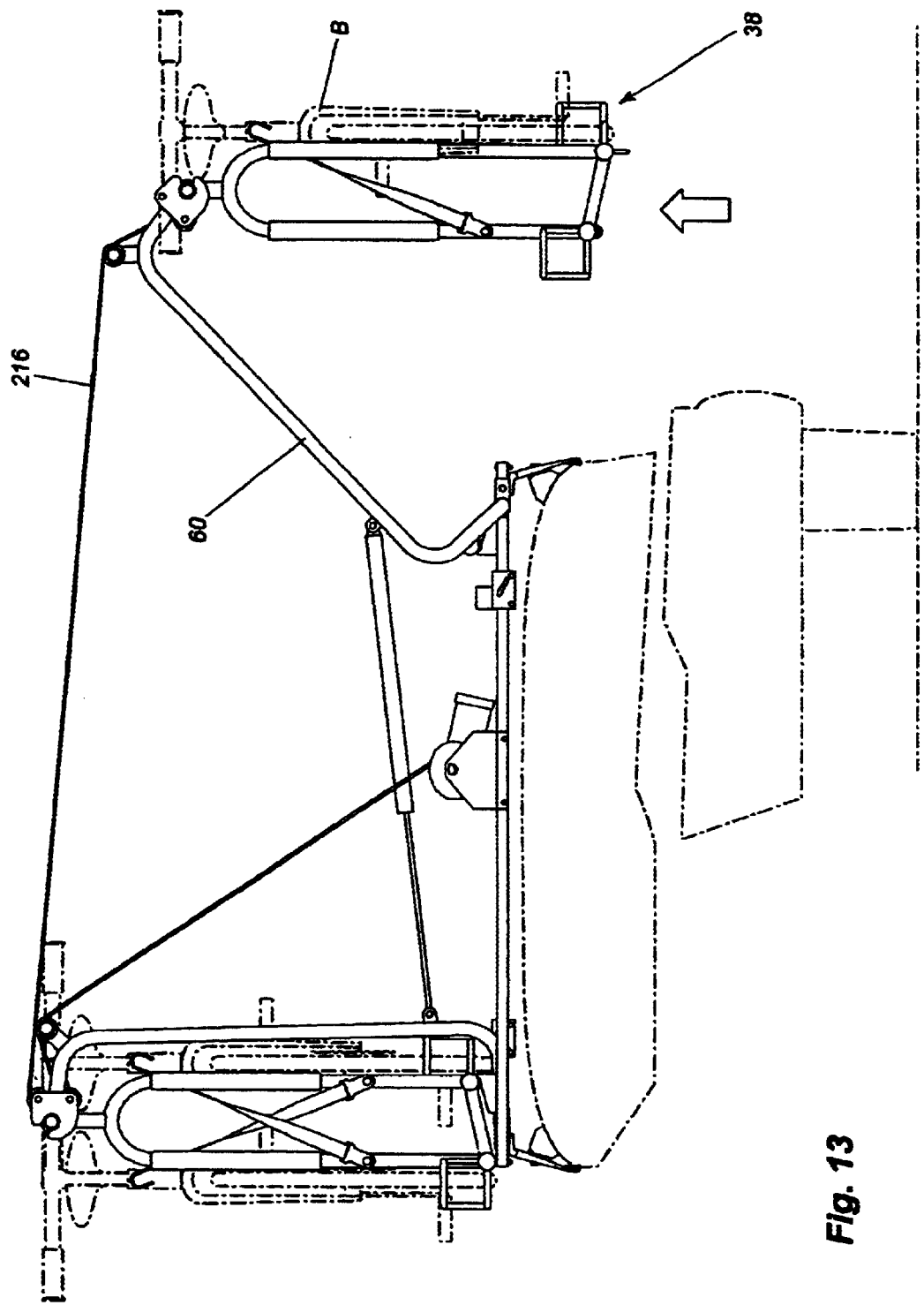
FIG. 13 is a front elevational view of the rooftop rack showing the hoisting position.

The device also includes an air cylinder generally designated by reference numeral 240. Air cylinder 240 includes a housing 242 secured to pivotal arm 60, as may be seen in FIG. 13, and a arm 244 connected to pivotal arm 160.

Figure 12:
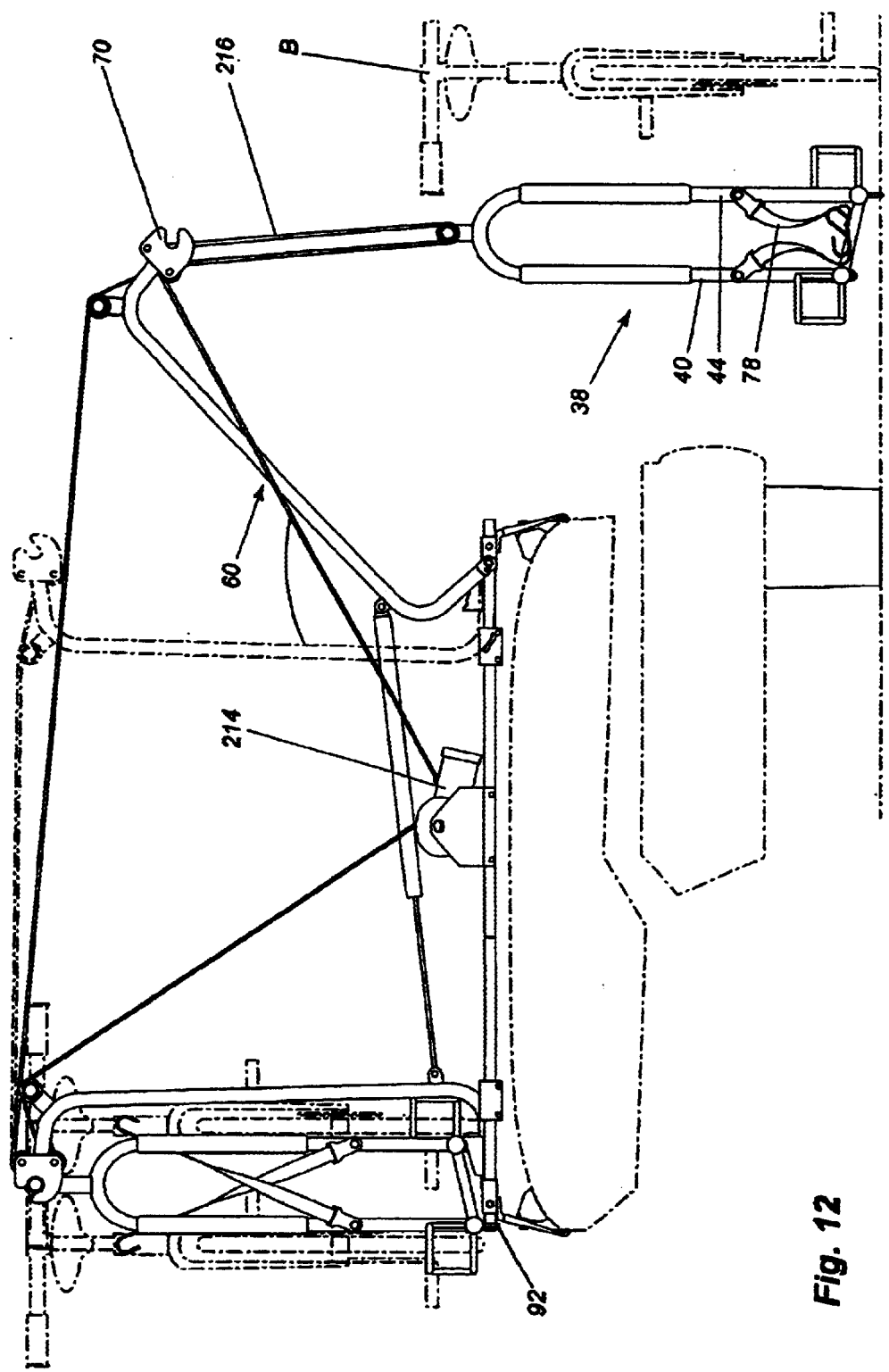
FIG. 12 is a front elevational view of the rooftop rack showing the bicycle loading positions.

In operation, and starting from the initial position wherein platform 38 is in a lowered position as shown in FIGS. 1 and 12, a bicycle B is placed on the platform with a rear wheel being in wheel cradle 54 and a front wheel being held by wheel cradle 56. Tie down strap 78 is then secured about the cross bar of bicycle B.

Figure 7:
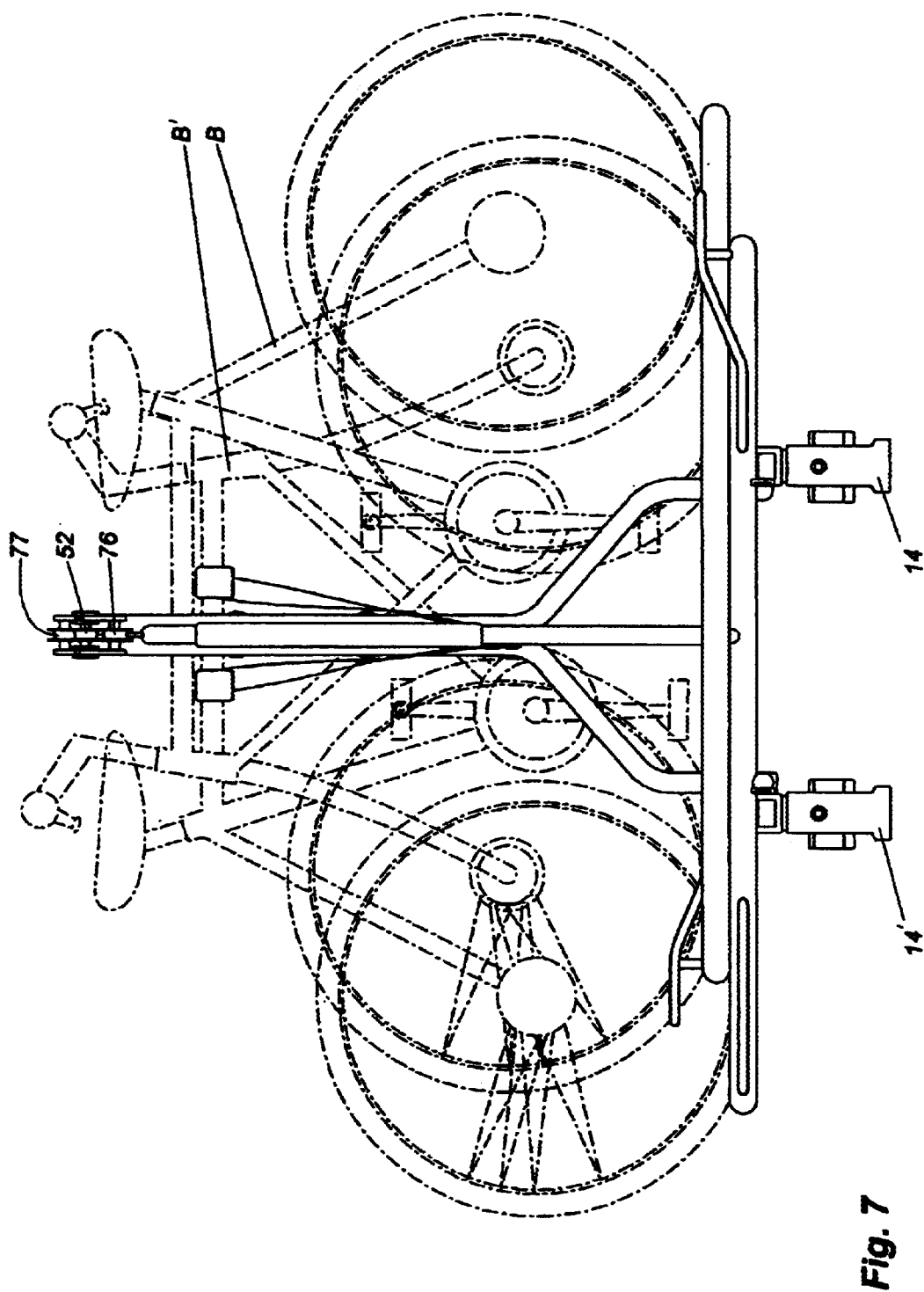
FIG. 7 is a view similar to FIG. 6 illustrating a pair of bicycles mounted on the rooftop rack.
Figure 11:
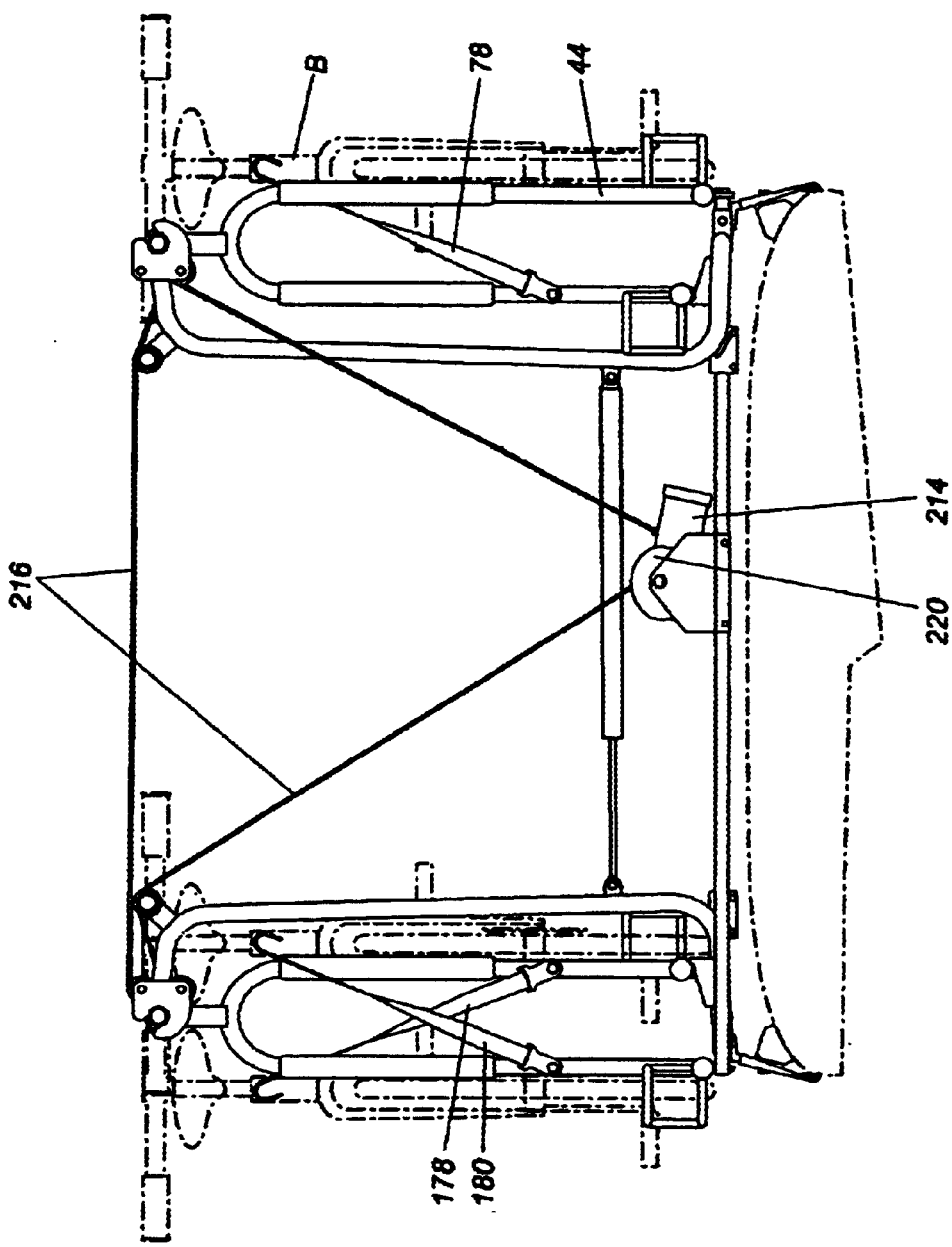
FIG. 11 is a front elevational view of the rooftop rack as seen from the front of a vehicle.

Although only one bicycle is illustrated for purposes of clarity (two being shown in FIG. 10), it is understood that a second bicycle can be placed with its wheels in wheel cradles 26 and 22, the bicycle preferably being in a reverse facing direction as shown in FIG. 7.

Figure 5:
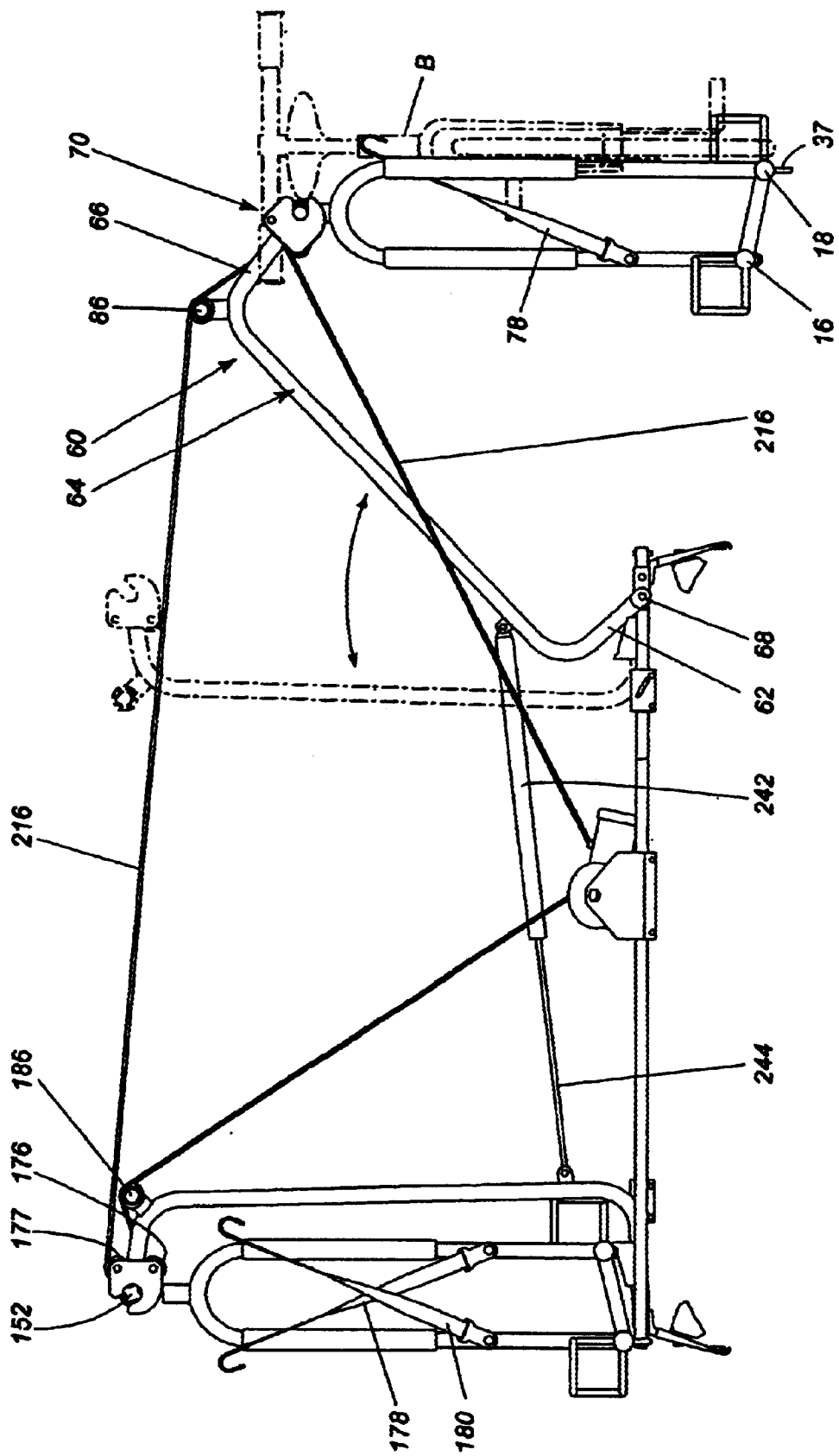
FIG. 5 is an end elevational view thereof.
Figure 6:
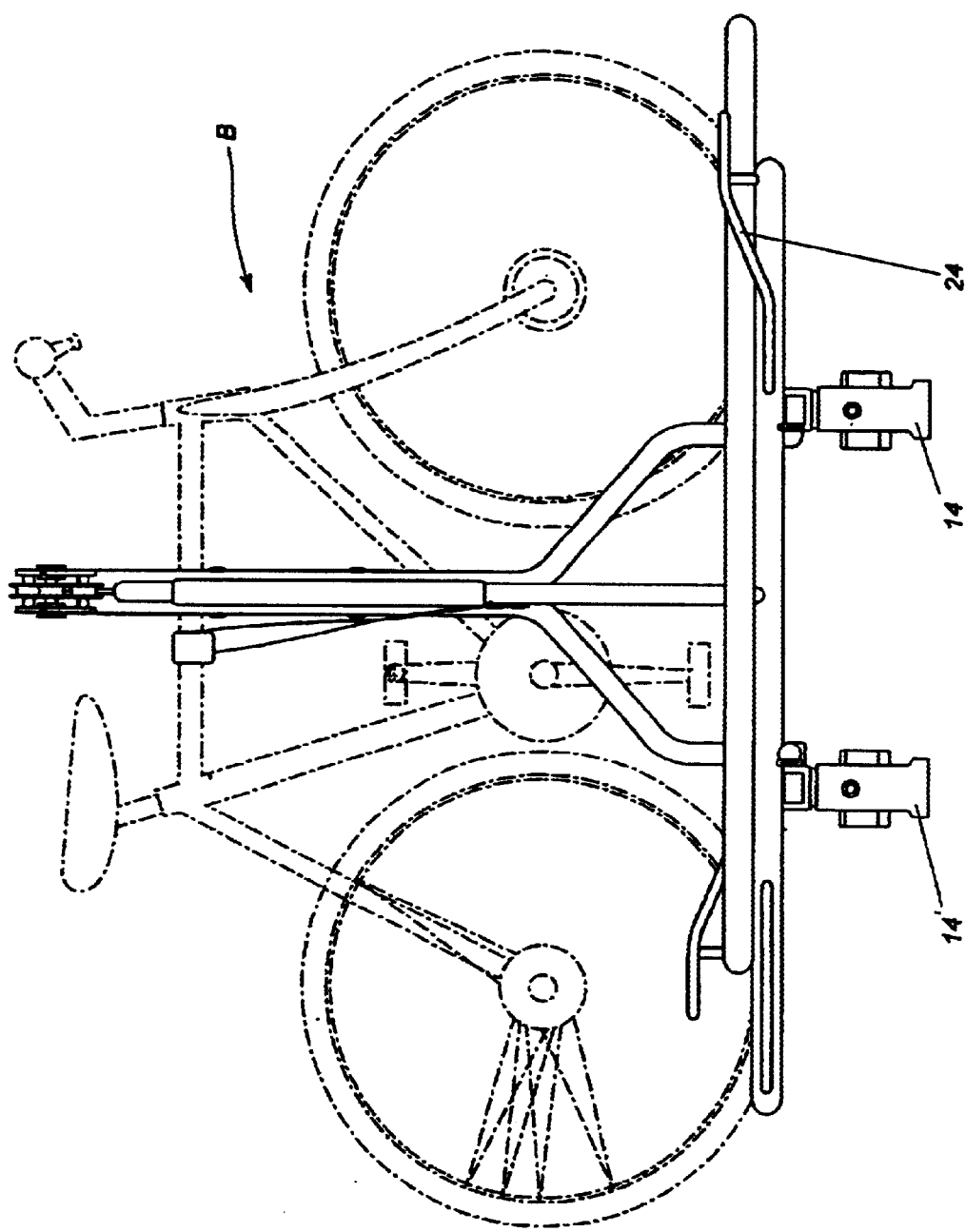
FIG. 6 is a side elevational view of the rooftop bicycle rack with a bicycle mounted thereon.

Cable 216, in the illustrated embodiment, extends from winch 212 around pulleys 186, 176, 152, 177, 86, 77, 52 and 76 through to motor 214. Upon activation of electric motor 214, platform 38 is lifted, as may be seen in FIG. 5, from the position shown in solid lines to a position wherein the boom is in the position shown in dotted lines.

When platform 38 is lifted to boom end member 70, it engages with U-shaped notch 72 such that it seats therein. Continued pulling on cable 216 will then cause boom 60 to move to an upright position. The boom then moves past the center of gravity such that platform 38, when seated on support bar 14, will not exert any outward force. It will also be noted that locking ring 92 engages an end of support bar 14. Means for locking the device in place may then be employed to prevent locking ring 92 from slipping over the edge of support bar 14.

Platform 138 is raised and lowered in a manner similar to that described with respect to platform 38. The same cable 216 is used for doing the same.

It will be understood that the above described embodiment is for purposes of illustration only and that changes or modifications may be made thereto without departing from the spirit and scope of the invention.

We claim:

1. A rooftop tack for carrying an object on a vehicle, said rooftop rack comprising:

a base mountable on a vehicle roof;

a pivotable arm having a first end pivotably connected to said base, said pivotable arm being moveable between a first storage position and a second outboard position;

a first platform; having means for returning two bicycles thereon;

a winch mounted on said base;

a cable extending from said winch to a distal end of said pivotable arm and then to said first platform; and the arrangement being such that when said pivotable arm is in said first storage position, said first platform is retained by said distal end of said pivotable arm while when said pivotable arm is in said second outboard position, said first platform can be released from said pivotable arm.

2. The rack of claim 1 wherein said winch is an electrically driven winch.

3. The rack of claim 1 further including means for securing said pivotable arm in an upright position, said means comprising a ring member designed to be secured to said base.

4. The rooftop racks of claim 1 wherein said base comprises first and second rack support bars extending transversely on the vehicle roof.

5. The rack of claim 1 wherein said pivotable arm is connected to a first side of said base, and further including a second pivotable arm connected to a second side of said base, a second platform for carrying a second object, said second platform being releasably retained by a second end of said second arm.

6. The rooftop rack of claim 5 wherein said second platform has means for retaining first and second bicycles thereon.

7. The rack of claim 5 further including a locking strap extending between said first and second pivotable arms when said first and second pivotable arms are in an upright position.

8. The rack of claim 5 wherein said first platform comprises first and second longitudinally extending members, said first longitudinally extending member having first and second cradles formed at opposed ends thereof, said second longitudinally extending member having first and second cradles at opposed ends thereof, each of said cradles being designed to receive a wheel of a bicycle.

9. The rack of claim 8 further including tie down straps for retaining first and second bicycles on said platform.

10. A rooftop rack for carrying bicycles on a vehicle, said rooftop rack comprising:

a base mountable on a vehicle roof;

a pivotable arm having a first end pivotably connected to said base, said pivotable arm being moveable between a first storage position wherein said arm is substantially upright, and a second outboard position wherein a distal end of said arm extends outwardly from said vehicle;

a first platform having means for retaining at least one bicycle thereon;

a winch mounted on said base;

a cable extending from said winch to said distal end of said pivotable arm and to said first platform; and the arrangement being such than when said pivotable arm is in said first upright storage position, said first platform is retained by said distal of said pivotable arm, the center gravity of said platform being located above a portion of said vehicle, while when said pivotable arm is in said second outboard position, said first platform can be released from said pivotable arm.

11. A rooftop rack for parrying bicycles on a vehicle, said rooftop rack comprising:

a base mountable on a vehicle roof;

a pivotable arm having a first end pivotably connected to said base, said pivotable arm being moveable between a first storage position wherein said arm is substantially upright, and a second outboard position wherein a distal end of said arm extends outwardly from said vehicle;

a first platform having means for retaining at least one bicycle thereon;

a winch mounted on said base;

a cable extending from said winch to said distal end of said pivotable arm and to said first platform;

said distal end of said pivotable arm having a platform receiving element such that when said platform is lifted from an second outboard position, said platform will be received and held by said platform receiving element of said pivotable arm; and the arrangement being such than when said pivotable arm is in said first upright storage position, said first platform is retained by said platform receiving element of said pivotable arm, the center of gravity of said first platform being located above a portion of said vehicle, while when said pivotable arm is in said second outboard position, said first platform can be released from said pivotable arm.

* * * * *